Aug. 31, 1937.  W. J. FIEGEL  2,091,588
BABBITTING APPARATUS
Filed June 6, 1934    5 Sheets-Sheet 1
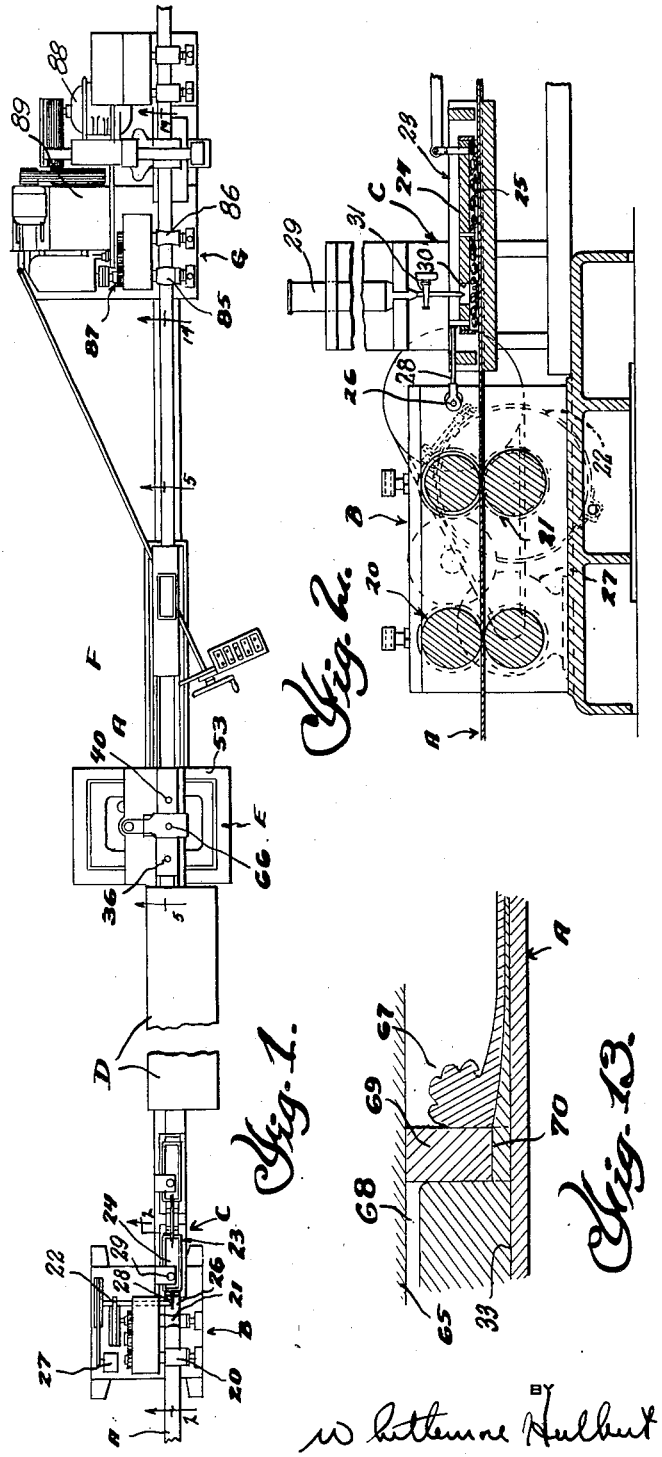
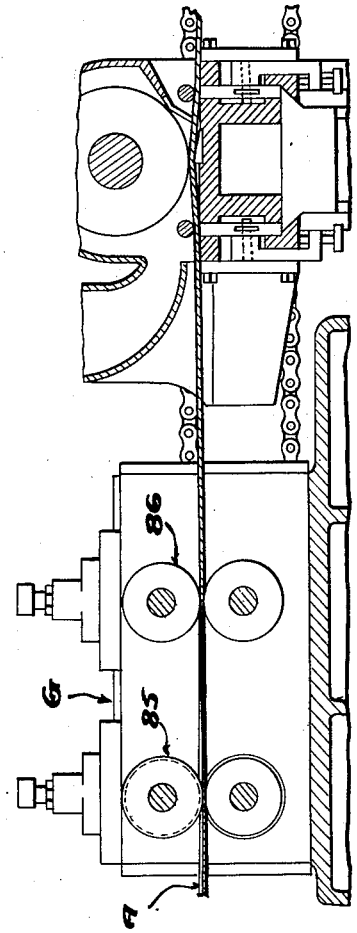
INVENTOR
William J. Fiegel
ATTORNEYS Aug. 31, 1937.  W. J. FIEGEL  2,091,588
BABBITTING APPARATUS
Filed June 6, 1934   5 Sheets-Sheet 2

INVENTOR
William J. Fiegel

BY
Whittemore Hulbert Whittemore & Belknap
ATTORNEYS

Aug. 31, 1937.   W. J. FIEGEL   2,091,588
BABBITTING APPARATUS
Filed June 6, 1934    5 Sheets-Sheet 3

Inventor
William J. Fiegel
By Whittemore Hulbert
Whittemore & Belknap
Attorneys

Aug. 31, 1937. W. J. FIEGEL 2,091,588
BABBITTING APPARATUS
Filed June 6, 1934 5 Sheets-Sheet 4
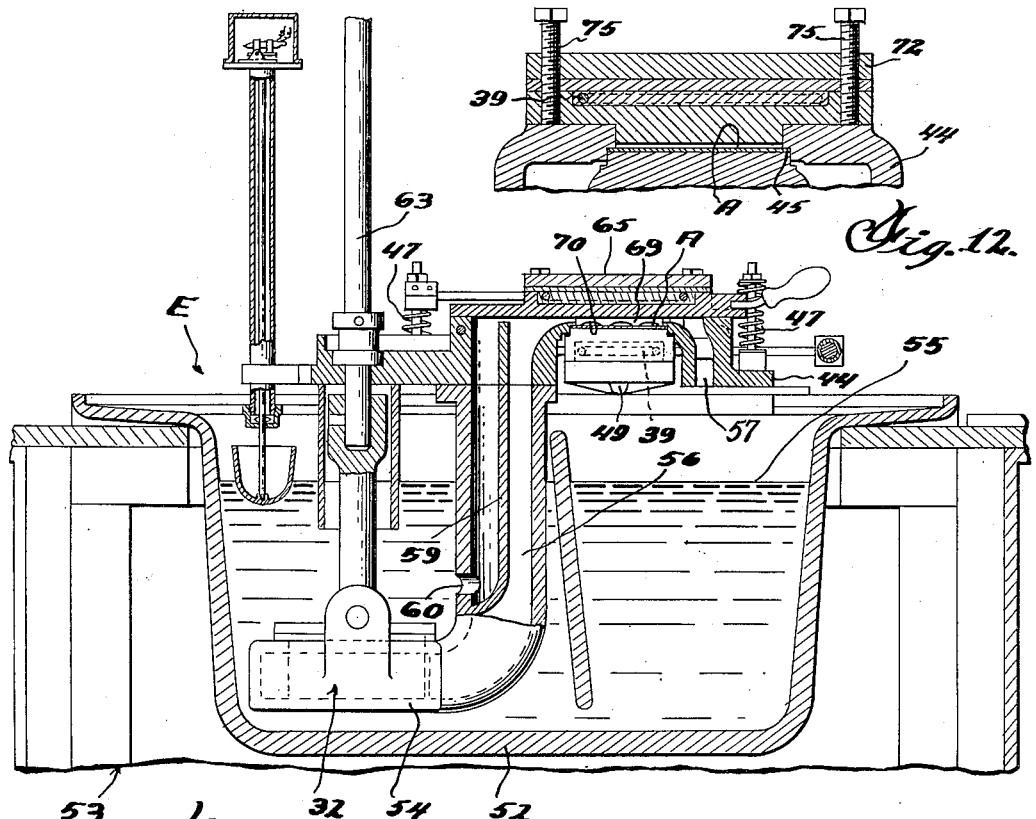
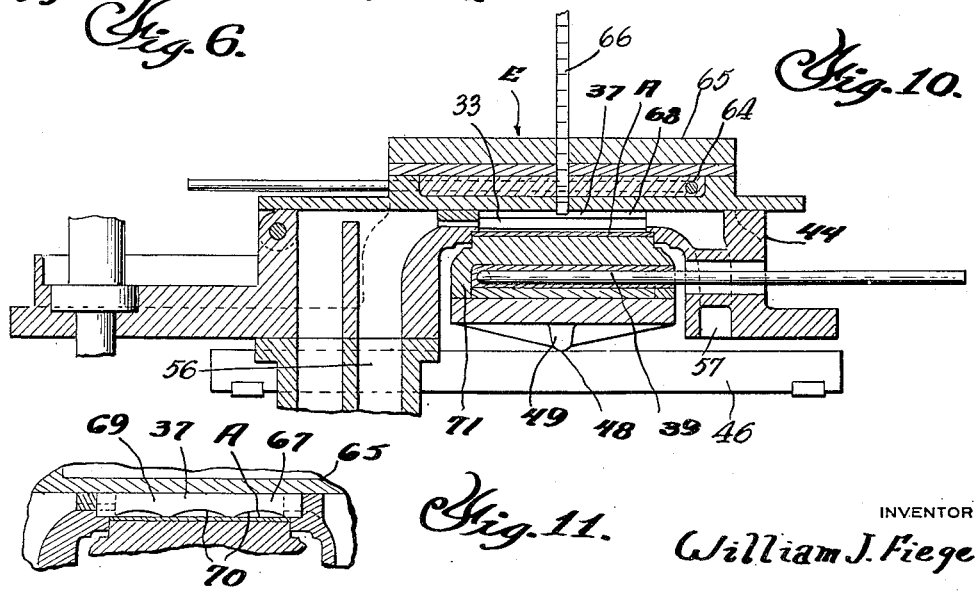
INVENTOR
William J. Fiegel
BY
ATTORNEYS

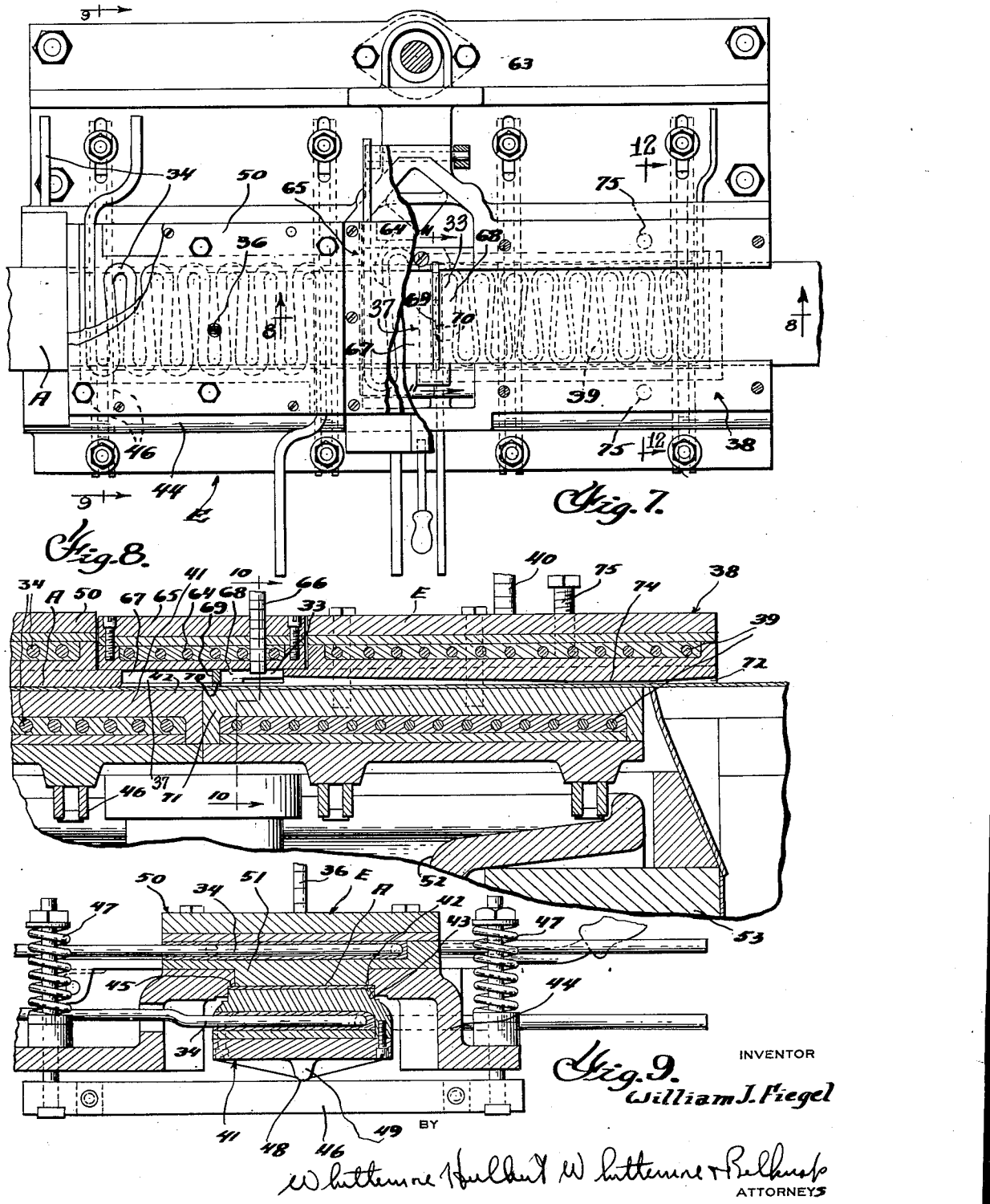

Patented Aug. 31, 1937

2,091,588

UNITED STATES PATENT OFFICE 2,091,588

BABBITTING APPARATUS

William J. Fiegel, Detroit, Mich., assignor to Bohn Aluminum & Brass Corporation, Detroit, Mich., a corporation of Michigan Application June 6, 1934, Serial No. 729,324

11 Claims. (Cl. 22—57.2)

This invention relates generally to babbitting devices and refers more particularly to apparatus for babbitting a continuous strip of metal suitable to form either steel back bearings or half bearings.

One of the principal objects of this invention is to simplify, render more efficient, and improve generally the art of babbitting a strip of metal preparatory to forming the strip into bearings and half bearings.

The invention contemplates simplifying the manufacture of articles embodying a liner of babbitt or other metal as well as expediting the production of such articles by providing apparatus incorporating means for applying the babbitt on a strip of metal as the latter is continuously advanced through the apparatus.

Another feature of this invention contributing materially to improving the quality of the babbitted articles consists in providing apparatus rendering it possible to maintain the temperature required to secure effective fusing between the babbitt and strip at the point of introduction of the babbitt to the strip.

Still another object of this invention resides in the provision of apparatus of the character previously set forth wherein the critical temperature at the point of introduction of the babbitt to the strip may be controlled within exceptionally close limits by varying either or both the rate of travel of the strip and velocity of flow of the babbitt at the aforesaid point.

A further advantageous feature of this invention also contributing materially to improving the quality of the product resides in the novel means provided for effectively cooling the strip subsequent to the babbitting operation and during movement of the strip through the apparatus. It may be pointed out in connection with this feature that the problem of effectively cooling the strip is greatly aggravated by the extremely high temperature of the ambient air or air immediately surrounding the strip as it is delivered from the babbitting unit, and also by the necessity of effectively accomplishing the cooling function in a relatively short interval so that the length of travel of the strip will be maintained well within practical limits. It has been proposed in the past to direct streams of water toward the strip as it is delivered from the babbitting unit, but this process is inefficient to effectively cool the strip due to the fact that the water is converted into steam by the ambient air before actually contacting with the strip. To this end the present invention contemplates effectively cooling the strip in a relatively short interval by spraying water toward the strip under a pressure sufficient to produce the atomizing effect required to impinge the small particles of the water against the strip.

A still further object of this invention resides in the provision of a guide engageable with opposite surfaces of the strip at the longitudinal side edges thereof and constructed to exert equal pressure upon the longitudinal side edges of the strip irrespective of variations in the gage of different strips admitted to the apparatus and irrespective of inaccuracies occurring in the thickness of the strips.

The present invention contemplates numerous other features of construction which will be made more apparent as this description proceeds, especially when considered in connection with the accompanying drawings, wherein:

Figure 1 is a semi-diagrammatic plan view of the apparatus forming the subject matter of this invention;

Figure 2 is a sectional view taken on the line 2—2 of Figure 1;

Figure 6 is a sectional view taken on the plane indicated by the line 6—6 of Figure 5;

Figure 7 is an enlarged plan view of a portion of the apparatus with certain parts broken away for the sake of clearness;

Figure 8 is a sectional view taken on the line 8—8 of Figure 7;

Figure 9 is a sectional view taken on the line 9—9 of Figure 7;

Figure 10 is a sectional view taken on the line 10—10 of Figure 8;

Figure 11 is a sectional view taken on the line 11—11 of Figure 7;

Figure 12 is a sectional view taken on the line 12—12 of Figure 7;

Figure 13 is a fragmentary sectional view taken on the line 13—13 of Figure 4;

Figure 14 is a sectional view taken on the line 14—14 of Figure 1.

Figure 3:
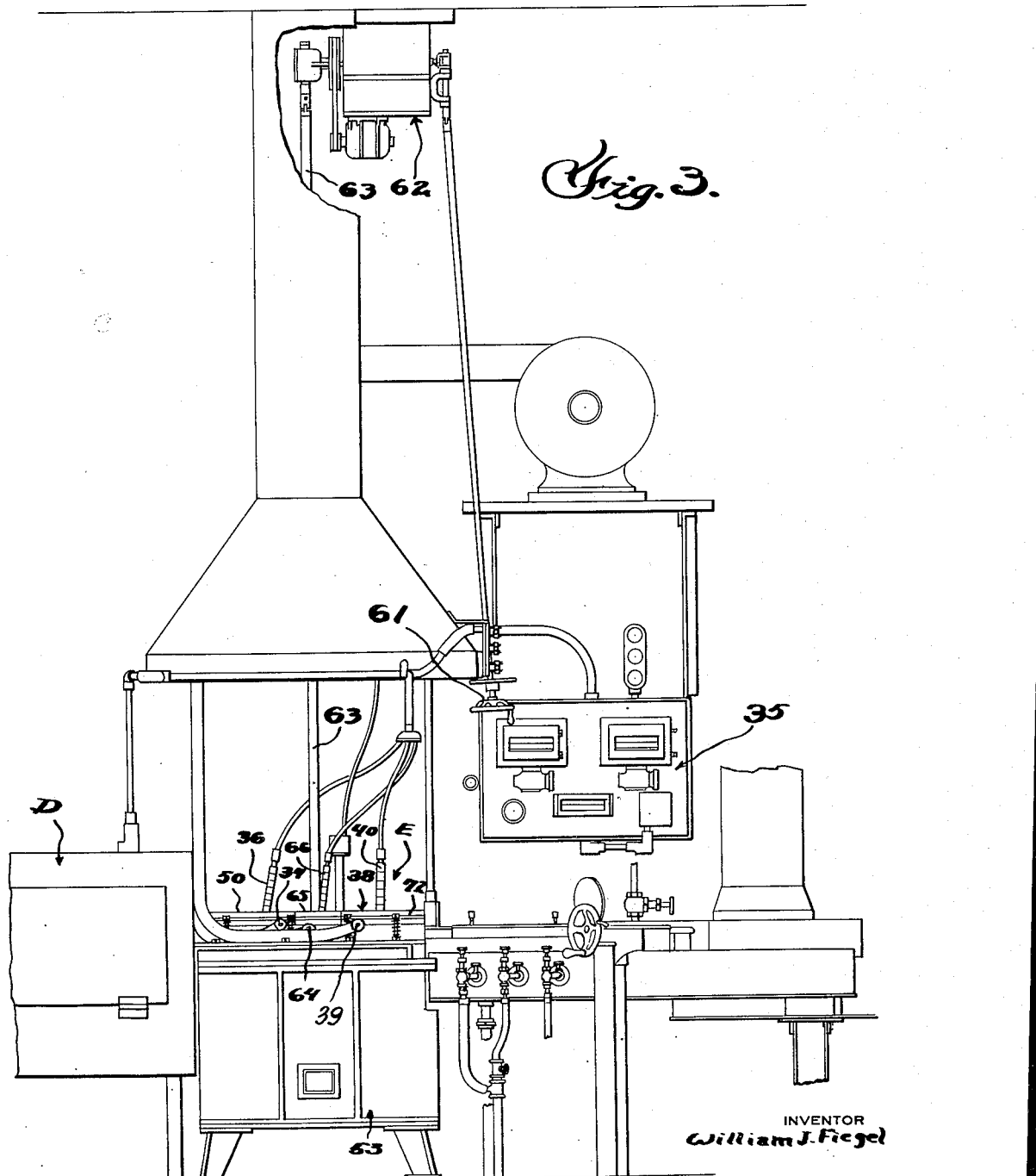
Figure 3 is a side elevational view of a portion of the apparatus shown in Figure 1.

In general a composite strip A consisting of a flat piece of steel tinned on one side is introduced to a unit B comprising a series of rolls acting upon the strip to flatten and tension the same. From the unit B the strip is passed through the unit C comprising mechanism for applying flux to the tinned surface of the strip whereupon the strip is introduced to an oven D having heating elements associated therewith for raising the temperature of the strip to the extent found most suitable for the succeeding babbitting operation performed by the unit E located adjacent the delivery end of the oven. The strip delivered from the babbitting unit E is admitted to the cooling unit F specially designed to effectively cool the strip prior to introducing the same to the driving mechanism G for drawing the strip through the preceding units in succession.

Referring more in detail to Figure 2 of the drawings, it will be noted that the unit B comprises two pairs of rolls 20 and 21 arranged upon opposite sides of the path of travel of the strip A and geared together so as to operate in unison. The upper rolls of each pair cooperate with the lower rolls to flex the strip A therebetween transversely in a direction to offset the tendency of the strip to curl at the longitudinal edges thereof during subsequent operations. The pairs of rolls are also adjusted to tightly engage the strip so as to be rotated in unison by the frictional engagement of the strip therewith, and a suitable drag brake 22 is associated with one of the rolls for retarding or resisting rotation of all of the rolls by the strip and thereby place a tension on the strip tending to hold the same taut.

The flux applying mechanism is located immediately adjacent the unit B and comprises a trough 23 through which the strip A is caused to travel. As will be observed from Figure 2, a reciprocable member 24 is disposed within the trough and is provided with a padded surface 25 of sufficient dimension to engage the tinned surface of the strip substantially throughout the width of the latter. The member 24 is reciprocated within the trough 23 by means of a crank 26 driven by a prime mover 27 and operatively connected to one end of the member 24 through the medium of a connecting rod 28. As previously set forth the purpose of the mechanism previously described above is to apply flux to the tinned surface of the strip and this is accomplished by impregnating the padding 25 with the flux. In detail a receptacle 29 containing the flux is supported above the trough 23 in any suitable manner and the flux is discharged through an opening 30 in the member 24 upon the padding 25 through the medium of a control valve 31.

The strip A is delivered from the fluxing unit C into the oven D supported in any suitable manner immediately adjacent the delivery end of the unit C. The oven is artificially heated in any suitable manner (not shown) to raise the temperature of the strip preparatory to passing this strip through the babbitting unit E.

The babbitting unit E is positioned to receive the strip delivered from the oven D and comprises means 32 for causing a flow of babbitt across the strip at a point 33 spaced from the delivery end of the oven in the direction of travel of the strip. Inasmuch as the temperature of the strip at the point 33 is highly critical in securing an effective fusing of the babbitt with the tinned surface of the strip suitable heating elements 34 are disposed upon opposite sides of the path of travel of the strip between the delivery end of the oven and the point 33. The resistance of the heating elements 34 is such as to maintain the strip discharged from the oven at the temperature required to insure an effective fusing of the babbitt with the tinned surface of the strip at the point 33 and this temperature is accurately indicated on the instrument panel 35 (shown in Figure 3) through the medium of a thermocouple 36. It may be pointed out at this time that tin melts at a higher temperature than babbitt and although the temperature in the space between the heating elements 34 may be varied, nevertheless, care is taken to maintain this temperature below the melting point of tin so that the latter will not reach a fluid state prematurely and flow off of the strip before the latter is introduced to the babbitt.

As soon as the strip A is advanced beyond the space between the heating elements 34 it passes through a chamber 37 located at the point 33 and is babbitted through the coaction of the means 32 to be more fully hereinafter described. After the babbitt is applied to the strip at the point 33 the strip is advanced through a fixture 38 to the cooling unit F. As shown particularly in Figure 8, the fixture 38 is for the purpose of securing a predetermined uniform thickness of babbitt on the top surface of the strip A and in order to facilitate leveling of the babbitt as it passes beneath the fixture 38, the babbitt is maintained in a molten state on the strip by a pair of heating elements 39 disposed upon opposite sides of the path of travel of the strip in the same manner as the elements 34. Inasmuch as the alloy resulting from fusing the tin and babbitt at the point 33 has a higher melting point than babbitt alone, the heating elements 39 are of greater heat generating capacity than the heating elements 34 so as to heat the strip passing therebetween to a greater temperature and thereby insure maintaining the alloy at the consistency found most practical for uniformly distributing the alloy on the sheet. The temperature of the heating elements 39 is also accurately indicated upon the instrument panel 35 by a thermocouple 40.

Figures 4, 5:
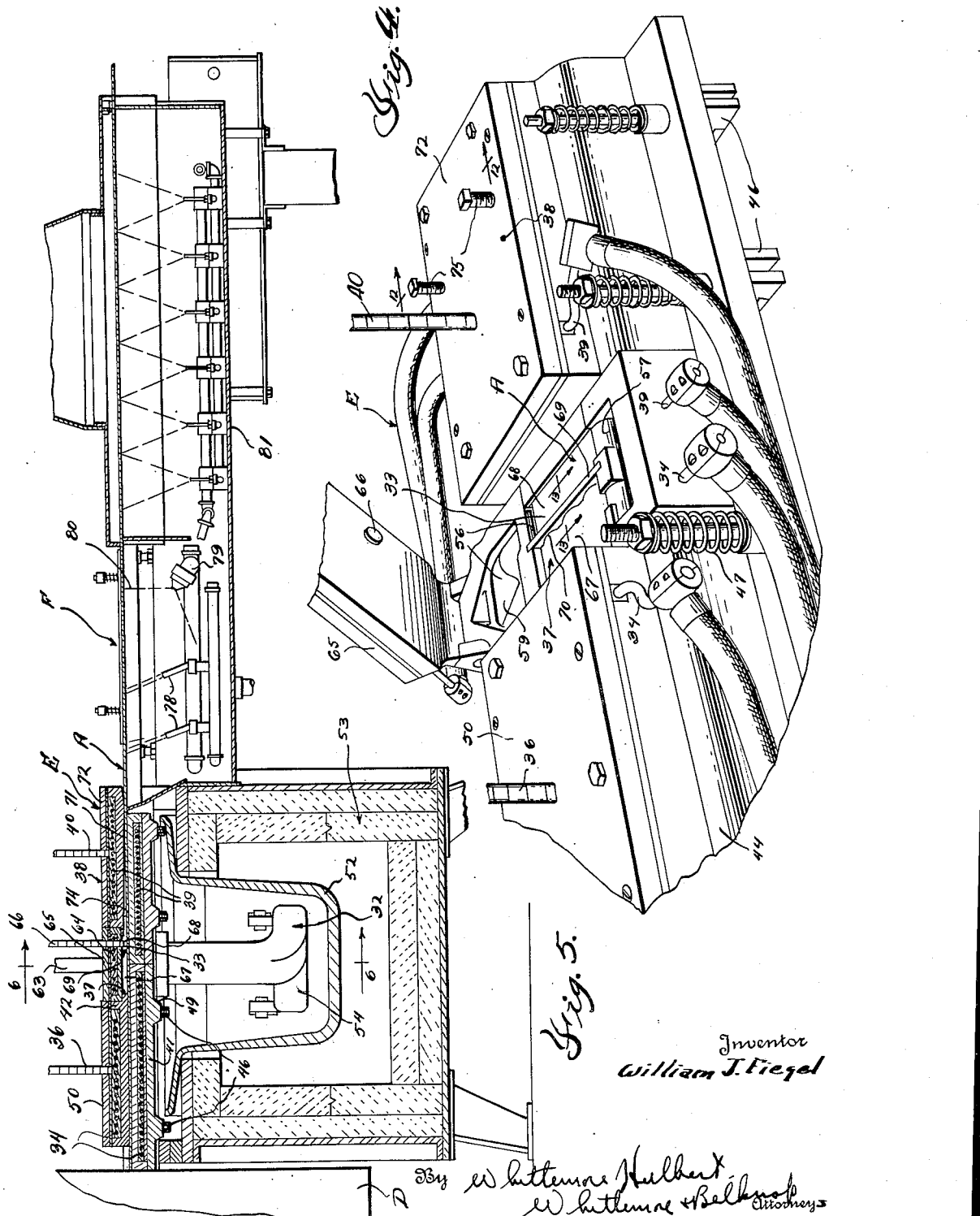
Figure 4 is a fragmentary perspective view featuring the babbitting unit.
Figure 5 is a sectional view taken substantially on the line 5—5 of Figure 1.

Referring more in detail to the foregoing construction it will be noted from Figures 5 and 8 that the lower heating element of the pair 34 is embedded within a support 41 extending in the direction of travel of the strip. The support 41 has a portion 42 at the upper end projecting into a longitudinally extending slot 43 in the frame 44 of the babbitting unit, and the top surface of the portion 42 is substantially flat for engaging the bottom surface of the strip as the latter is discharged from the oven D. As shown in Figure 9, the above construction is such that the longitudinal edges of the slot 43 in the frame 44 engage the opposite side edges of the strip and prevent lateral shifting of the strip relative to its support 41. As will also be observed from Figure 9, the strip is prevented from vertical displacement relative to the support 41 by means of shoulders 45 formed on the frame 44 at opposite sides of the slot 43 to overhang and engage the upper surface of the strip at opposite edges of the latter.

The longitudinal marginal edges of the strip are maintained in frictional engagement with the shoulders 45 by means of suitable cross heads 46 extending transversely of the support 41 beneath the frame 44 and normally yieldably urged toward the support 41 by means of springs 47. As shown in Figure 9, a line contact between the cross heads 46 and support 41 is effected as at 48 so as to permit rocking of the support about its longitudinal axis relative to the heads. In detail the support is formed with a longitudinally extending bead 49 intermediate the side edges thereof for engagement with the cross heads and the bead is rounded to form the desired line contact 48 previously set forth. With the foregoing construction it will be apparent that the support 41 will automatically adjust itself to exert equal pressures upon the longitudinal marginal edges of the strip A irrespective of different gages of strips it is desired to pass through the apparatus.

The upper heating element of the pair 34 is embedded within a cap 50 secured to the frame 44 on opposite sides of the path of travel of the strip and having a depending longitudinally extending central portion 51 contacting with the tinned top surface of the strip intermediate the shoulders 45. Inasmuch as both the cap and support contact with the strip during its passage from the oven to the babbitting means 32 and in view of the fact that the heating elements are embedded in these members it necessarily follows that the strip will be heated as it passes therebetween.

As previously stated the strip A is delivered to the babbitting chamber 37 after passing between the heating elements 34 and accordingly, the means for supplying babbitt to the strip will now be described in detail. The aforesaid means comprises a pot 52 adapted to contain a liberal quantity of babbitt and arranged within a furnace 53 heated in any suitable manner to maintain the babbitt in the pot molten. As shown particularly in Figure 6, the pot 52 is located below the chamber 37 necessitating raising the babbitt from the pot to the elevation of the strip passing through the chamber. The above is accomplished herein by locating a displacement pump 54 within the pot below the level of the babbitt in the latter indicated in Figure 6 by the reference character 55. The discharge side of the pump communicates with the chamber 37 above the top surface of the strip A through the medium of a conduit 56 having the upper end opening into the chamber 37 in such a manner as to discharge the babbitt over the top surface of the strip A transversely to the path of travel of the strip. The capacity of the pump 54 is so determined as to supply an amount of molten babbitt to the chamber 37 in excess of the quantity actually required in babbitting the strip and this excess babbitt is permitted to flow back into the pot through an outlet opening 57 formed in the side wall of the chamber opposite the wall through which the conduit 56 extends. As a matter of fact, the capacity of the pump 54 is preferably so great as to supply more molten babbitt than it is possible to pass through the chamber 37, and this excess Babbitt metal flows over the wall or baffle 59 in the conduit 56 back into the pot through the discharge opening 60. Hence a constant flow of molten babbitt across the strip A as the latter passes through the chamber 37 is insured.

Inasmuch as the velocity of flow of the babbitt across the strip A effects to a certain extent the temperature at which fusing of the babbitt with the strip takes place, and in view of the fact that this temperature is of a highly critical nature, it is desirable to provide some means for varying the speed of the pump 54. Referring to Figure 3 of the drawings, it will be noted that the speed of the pump may be varied from a position adjacent the instrument panel 35 by manipulating a hand wheel 61 connected to a suitable Reeves transmission 62 which in turn is operatively connected to the drive shaft 63 for the pump. This latter arrangement provides for accurately controlling the flow of babbitt across the strip passing through the chamber 37 and consequently permits accurately regulating the temperature within the chamber 37.

In view of the fact that the temperature in the chamber 37 is highly critical provision is made herein for heating the interior of the chamber and this is accomplished by embedding a heating element 64 within the cover 65 forming the top wall of the chamber 37. As shown particularly in Figure 8, the heating element 64 cooperates with the lower heating elements of each of the pairs 34 and 39 to maintain the desired temperature in the chamber 37. In this latter figure, it is also shown that the heat generating capacity of the heating element 64 is greater than that of the heating elements 34 and approximates the heat generating capacity of the heating elements 39. The increased heat afforded by the element 64 is permissible at the point 33 since it is desired to actually fuse the babbitt and tin at this point. The temperature in the chamber 32 may be indicated on the instrument panel 35 by a thermocouple 66 secured to the cover 65 in such a manner as to not interfere with movement of the cover to the open position thereof shown in Figure 4.

As shown particularly in Figure 4, the chamber 37 is divided into two compartments 67 and 68 by means of a weir or dam 69 extending transversely of the path of travel of the strip and having a recess 70 in the edge thereof adjacent the top surface of the strip providing communication between the two compartments. It is to be noted that the dam is so located that the compartment 67 is out of direct communication with the discharge end of the conduit 56 so that the major volume of babbitt flowing from this conduit is passed across the portion of the strip in the compartment 68. The purpose of the weir or dam 69 is perhaps better illustrated in Figure 13 wherein the level of the babbitt in the compartment 68 is shown as considerably greater than the babbitt passing into the compartment 67 through the communicating recesses 70. Concentrating the flow of a relatively great volume of babbitt in the compartment 68 by the weir materially adds to all of the above features in maintaining the desired temperature of the babbitt, while permitting a small amount of the babbitt to flow through the recesses 70 into the compartment 37 acts to lift the flux on the tinned surface of the strip A immediately before admitting this tinned surface to the compartment 68.

As the babbitted strip passes from the compartment 68 it is advanced between the pair of heating elements 39 previously described as acting to maintain the alloy or tin and babbitt in a sufficiently molten state to permit spreading the same to a uniform thickness on the top surface of the strip. In detail the lower heating element of the pair 39 is embedded in a support 71 forming a continuation of the support 41 and mounted in the same manner as the latter support to exert equal pressures upon the marginal edges of the strip irrespective of the gage of the latter or irrespective of slight variations in thickness effected by manufacturing inaccuracies. The upper heating element of the pair 39 is embedded in a cap 72 similar in many respects to the cap 50 hereinbefore described, but differing therefrom in that the lower surface of the cap is spaced vertically from the top surface of the composite strip A and means is provided for adjusting the cap to vary this spacing. As shown particularly in Figure 8 the bottom surface of the cap 72 is so fashioned as to progressively decrease the space above the top surface of the strip from the compartment 68 in the chamber 37 to an area adjacent the rear end of the cap and designated generally in Figure 8 by the reference character 74. The space between the area 74 of the cap and adjacent surface of the strip A corresponds to the desired thickness of babbitt or alloy upon the strip. This space, and accordingly the thickness of babbitt provided on the strip may be varied by vertically adjusting the cap through the medium of the bolts 75 threaded in the cap and engaging the frame 44 of the babbitting unit on opposite sides of the path of travel of the strip in the manner clearly shown in Figure 12.

After the desired thickness of babbitt or alloy has been uniformly distributed over the top exposed surface of the strip A in the manner previously set forth, the strip is advanced to the cooling unit F having means for discharging a blast of air against the lower surface of the strip as it is moved along its path of travel. The aforesaid means comprises one or more nozzles 78 communicating with a source of air under pressure and fashioned to discharge a substantially flat stream of air against the strip. After the strip has been initially cooled by the air the same is caused to travel past a nozzle 79 designed to direct a flow of cooling liquid against the bottom surface of the strip. This nozzle 79 is fashioned to discharge a conical spray of cooling liquid, designated in Figure 5 by the reference character 80, and the nozzle is so positioned with respect to the strip as to discharge the cooling medium in a direction opposite to the direction of advancement of the strip. By reason of the foregoing the cooling liquid is broken up into small particles and it is found that these particles will impinge against the strip A irrespective of the temperature of the ambient air or air immediately surrounding the strip. From the nozzle 79 the strip is caused to pass over a battery of sprays designated generally by the reference character 81. The sprays 81 may be of the usual type, since by the time the strip is admitted thereto the temperature of the strip is sufficiently low to render the operation of the sprays efficient in effecting the final cooling of the strip.

Located beyond the unit F in the direction of advancement of the strip is the driving unit G having means for moving the strip throughout the path of travel previously referred to. This driving unit is shown in Figures 1 and 14 as comprising two pairs of driving rolls 85 and 86 arranged upon opposite sides of the path of travel of the strip and frictionally engaging the latter. The driving rolls are operatively connected for rotation as a unit through the medium of suitable gearing 87 and this gearing is connected to a prime mover 88 through the medium of suitable variable speed mechanism designated generally by the reference character 89. The arrangement is such as to permit varying the rate of travel of the strip through the various units previously described and this feature is of particular importance since the linear speed of travel of the strip through the chamber 37 also has an effect upon the temperature within this chamber. In other words, the temperature within the chamber 37 may be regulated to extremely close limits by varying the velocity of flow of the babbitt across the strip and by adjusting the rate of linear travel of the strip through the chamber.

While the specific embodiment of the invention described herein has been found in practice to give entirely satisfactory results, nevertheless, it will be apparent to those skilled in this art that various changes in many of the non-essentials of the invention may be resorted to without departing from the spirit and scope thereof, and to this end reservation is made to make such changes as may come within the purview of the accompanying claims.

What I claim as my invention is:

1. In apparatus for babbitting a strip of metal, means for advancing the strip along a predetermined path of travel, means forming a chamber located in the path of travel of the strip and constructed to permit the latter to pass therethrough, a weir extending transversely of the path of travel of the strip within the chamber dividing the latter into two compartments and having an opening therethrough establishing communication between said compartments, and means causing a continuous stream of molten babbitt to flow through one of the compartments across the surface of the strip to be babbitted.

2. In apparatus for babbitting a strip of metal, means for advancing the strip along a predetermined path of travel, means forming a chamber located in the path of travel of the strip and constructed to permit the latter to pass therethrough, a weir extending transversely of the path of travel of the strip within the chamber dividing the latter into two compartments and having a recess in the edge thereof adjacent the top surface of the strip establishing communication between the compartments, and means causing a continuous stream of molten babbitt to flow through the last compartment in relation to the direction of travel of the strip whereby a limited quantity of babbitt is caused to flow along the strip in a direction opposite the direction of travel of the strip into the other compartment through the recess aforesaid in the weir.

3. In apparatus for babbitting a strip of metal, means for advancing the strip of metal along a predetermined path, means located at a predetermined point in the path of travel of the strip for depositing molten babbitt on the surface of the strip to be babbitted, and means for subsequently cooling the strip including a nozzle fashioned to direct a conical-shaped stream of cooling medium toward the strip and so arranged that the axis of the stream is inclined from the nozzle in a direction opposite the direction of advancement of the strip.

4. In apparatus for babbitting a strip of metal, means for advancing the strip of metal along a predetermined path, means located at a predetermined point in the path of travel of the strip for depositing molten babbitt on the surface of the strip to be babbitted, means spaced from the aforesaid means in the direction of travel of the strip for distributing the molten babbitt on the strip to a uniformly predetermined thickness, and means for subsequently cooling the strip including a nozzle located below the strip and fashioned to direct a conical-shaped stream of cooling medium toward the strip at an angle to a line perpendicular to the path of travel of the strip.

5. In apparatus for babbitting a strip of metal, means for advancing the strip along a predetermined path of travel, a support over which the strip moves, means engaging opposite longitudinal edges of the strip to prevent lateral displacement of the strip relative to the support, means engaging the side of the strip opposite the side of the latter engaged by the support and adjacent the marginal edges of the same, and means yieldably urging the strip into engagement with said last named means.

6. In apparatus for babbitting a strip of metal, means for advancing the strip along a predetermined path of travel, a support over which the strip moves, means positioned opposite the support and engageable with the opposite side of the strip adjacent the longitudinal edges of the latter, means mounting said support and second named means for relative movement toward and away from each other to compensate for strips of different thickness, and yieldable means normally relatively moving the support and second named means toward each other to frictionally engage opposite sides of the strip.

7. In apparatus for babbitting a strip of metal, means for advancing the strip along a predetermined path of travel, a support over which the strip moves, means positioned opposite the support and engageable with the opposite side of the strip adjacent the longitudinal edges of the latter, means mounting said support and second named means for relative movement toward and away from each other to compensate for strips of different thickness, yieldable means normally relatively moving the support and second named means toward each other to frictionally engage opposite sides of the strip, and means balancing the pressures exerted by the yieldable means on opposite marginal edges of the strip irrespective of variations in thickness of the strip.

8. In apparatus for babbitting a strip of metal, means for advancing the strip along a predetermined path of travel, a support over which the strip moves, means positioned opposite the support and engageable with the opposite side of the strip adjacent the longitudinal edges of the latter, means coacting with the support to yieldably urge the latter toward the strip and thereby frictionally engage the marginal edges of the strip with the second named means, and means mounting the support for rocking movement about the longitudinal axis thereof to balance the pressures exerted on opposite marginal edges of the strip irrespective of variations in thickness of the strip.

9. In apparatus for babbitting a strip of metal, means for advancing the strip along a predetermined path of travel, a chamber located in the path of travel of the strip and constructed to permit the strip to pass therethrough, said chamber having an inlet opening at one side of the path of travel communicating with a source of babbitt supply and having an outlet opening at the opposite side of the path of travel, both openings arranged to communicate with the chamber in substantially the plane of the strip so as to insure the flow of a continuous stream of babbitt across the surface of the strip.

10. In apparatus for babbitting a strip of metal, means for advancing a tinned and fluxed strip of metal along a predetermined horizontal path, means causing a continuous and comparatively shallow stream of molten babbitt to flow transversely of the path of travel of the fluxed strip across the surface of the latter to be babbitted.

11. In apparatus for babbitting a strip of metal, means for advancing a tinned and fluxed strip of metal along a predetermined horizontal path of travel, means forming an open chamber located in the path of travel of the strip, and constructed to permit the latter to pass therethrough, means causing a continuous and comparatively shallow stream of molten babbitt to flow through the chamber transversely of the path of travel of the strip, and across the surface of the latter to be babbitted, while exposing the surface of the metal for skimming.

WILLIAM J. FIEGEL.